United States Patent Office 3,282,497
Patented Nov. 1, 1966

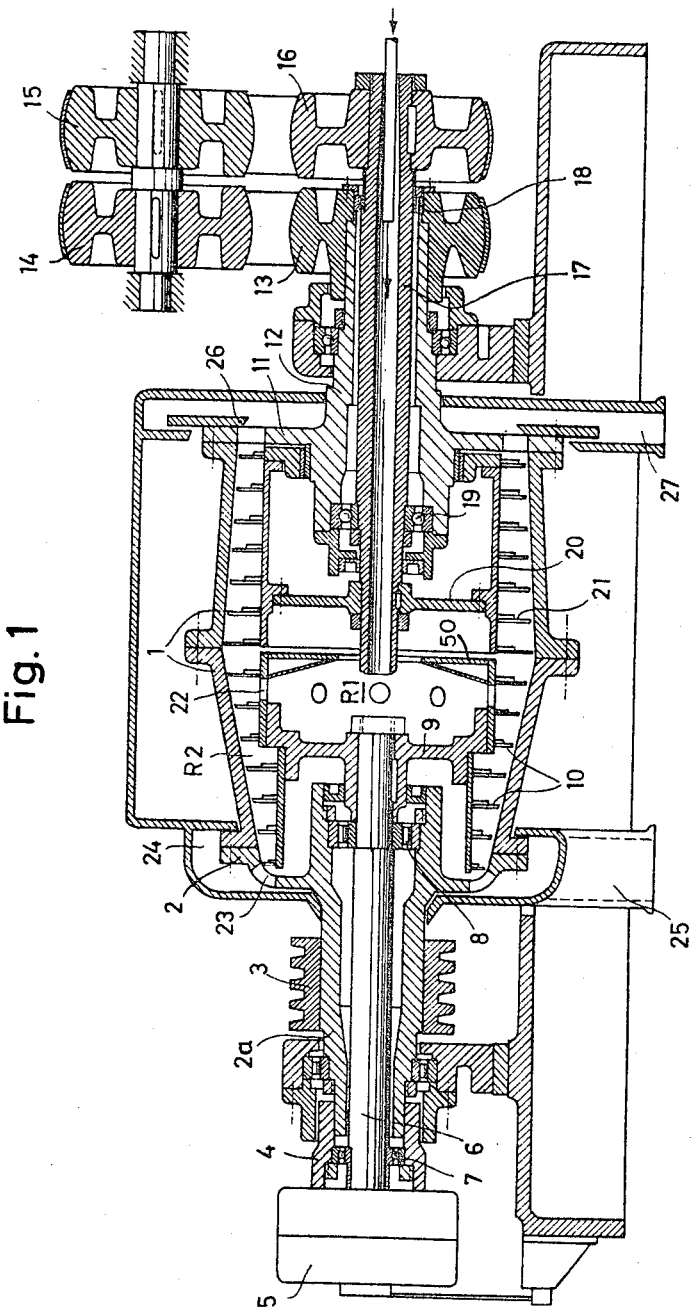

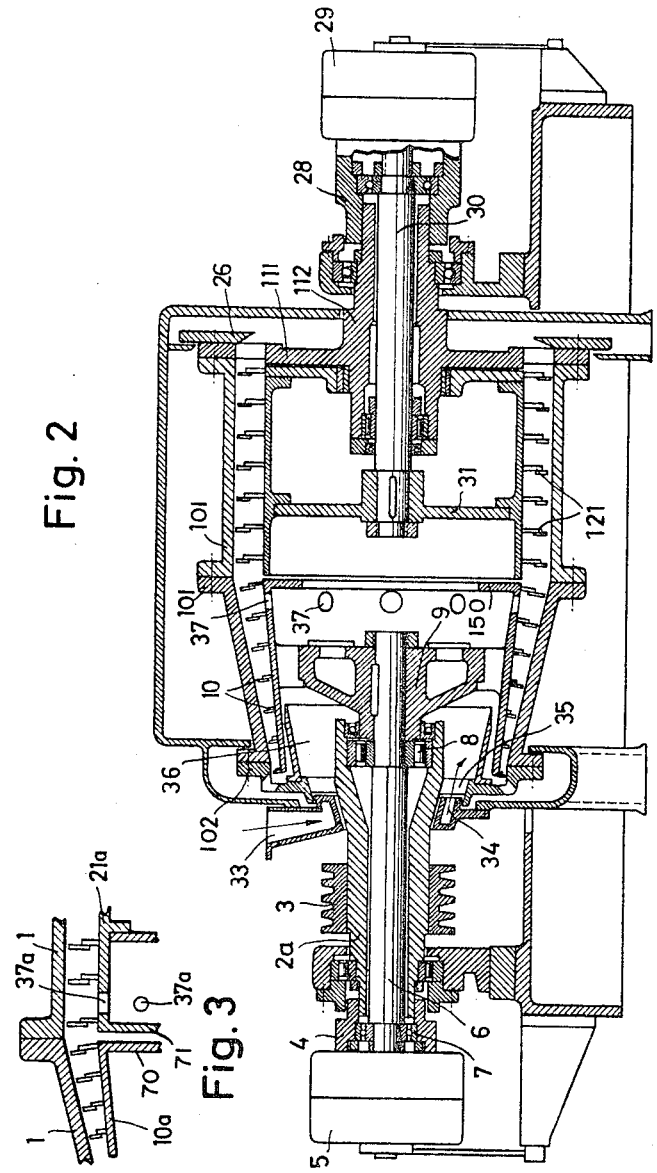

3,282,497
PROCESSES AND APPARATUS FOR THE SEPARATION OF SOLIDS FROM A SUSPENSION
Ludwig Schmiedel, Socking, near Starnberg, Germany, assignor to Starcosa G.m.b.H. & Co., Wunstorf, Germany
Filed July 13, 1964, Ser. No. 382,257
Claims priority, application Germany, July 25, 1963, Sch 33,616
17 Claims. (Cl. 233—7)

The present invention relates to processes and to apparatus for separating solids of different particle sizes and, possibly, different specific gravities from a suspension. The known apparatus used for this purpose includes, in addition to other machines, worm centrifuges with solid-wall drums, also known as centrifugal separators. These machines comprise a rotatable solid-wall drum and a worm drum within the solid-wall drum which rotates at a speed different from that of the solid-wall drum. It is desirable to make the difference in speed as great as possible, in order to obtain the highest possible output of the machine.

The difference in speed between the solid-wall drum and the worm drum is established on the basis of the particle size and the specific gravity of the solids contained in the material to be separated. However, the size of the particle to be separated often differs greatly and even fluctuates in the same material. For example, in potato starch, the particle sizes may fluctuate between 2 to $100\mu$. The same is true of the specific gravity of the solids when they are composed of different substances. If a comparatively big difference in speed between the solid-wall drum and the worm drum is used in the case of such materials, for example, 60 revolutions per minute, then, in the processing of potato starch, about 85% to 90% of solids corresponding to particle sizes of $12\mu$ or greater, is discharged. On the other had, the portion containing extremely fine particles, that is, a particle size of $2\mu$, in the case of potato starch, is not deposited, due to the relative rotational motion of the worm in the solid-wall drum and is thereby discharged together with the waste liquid. This must be avoided.

If the difference in speed between the solid-wall drum and the worm drum is reduced, for example, to 20 revolutions per minute, the separating effect will be improved, but the output of the machine will be substantially smaller.

It is an object of the invention to overcome this deficiency as regards the inverse relationship between output and separating efficiency.

The process according to the invention is characterized in that the suspension is first introduced into a solid-wall worm centrifuge having a comparatively high difference in speed, in order to discharge separated solids of large particle size, and the waste water together with the finer particles of the solids. The waste water and finer solids are conducted to a second solid-wall worm centrifuge with a substantially smaller difference in speed, which separates the extremely fine particles of the solids from the liquid. In this manner, the respective most advantageous differences in speed between the solid-wall drum and the worm drum will be effective for separating the coarse and the fine particle sizes, so that both the coarse particles as well as the extremely fine particles are separated at the end of the centrifuging process.

The apparatus used for carrying out the above process may also be a single worm centrifuge with a solid-wall drum, which is characterized in that the worm drum, arranged in the interior of the solid-wall drum and driven at a speed different from the speed of said solid-wall drum, is subdivided into two portions or members, one of which, the portion which discharges coarse solids, rotates with a great difference in speed in the solid-wall drum, while the other portion of the worm drum, conveying only the finer particles of the solids, has a substantially smaller difference in speed with respect to the solid-wall drum.

This arrangement permits the two machines to be combined into a single self-contained unit.

Expediently, that portion of the solid-wall drum surrounding the portion of the worm drum rotating at comparatively slow speed in relation to the solid-wall drum widens slightly in conical manner in the direction of the discharge of the solids. This has the effect of improving the discharge of the solids from the comparatively slowly rotating worm drum in the direction towards the other worm drum.

The inlet openings for the suspension in the worm drums are advantageously arranged adjacent a separating wall or partition which is provided between the two worm drums. The inlet openings may be provided in either worm drum portion, as well as at different distances from the separating wall or partition.

Two embodiments of the present invention will be described below by way of example in the accompanying drawings, wherein:

FIGURE 1 is a side view partly in section of a first embodiment of a centrifuge according to the invention;

FIGURE 2 is a side view partly in section of a second embodiment of a centrifuge; and FIGURE 3 is a detail of a portion of a centrifuge showing a modification of the inlet openings.

In FIG. 1 there is shown a worm centrifuge with a solid-wall drum 1. The solid-wall drum 1 is driven by the V-belt pulley 3 via member 2a which has flange portion 2 connected to drum 1. The transmission 5 is driven by member 2a through the hub 4. The transmission 5 drives, by way of the shaft 6 positioned in a ball bearing 7 and a roller bearing 8, the hub disc 9 of the conical discharge worm 10. The transmission 5 has a suitable gear arrangement such that if member 2a is driven at 2000 revolutions per minute, the driven speed of shaft 6 is about 1940 r.p.m. The difference in speed between the solid-wall drum 1 and the discharge worm 10 thus amounts, for example, to 60 r.p.m..

The solid-wall drum 1, which is driven by the V-belt pulley 3, is connected to the belt pulley 13 by way of the hub member 11 and the hub 12. The belt pulley 13 drives the belt pulley 16 by way of gears 14,15. The belt pulley 16 is driven by gear 15 and in turn drives the feed worm 21 by way of the hollow shaft 17 positioned in the bearings 18 and 19, and the disc 20. The belt pulleys and gears are arranged such that the resulting difference in speed between the solid-wall drum 1 and the feed worm 21 is about 10 r.p.m. The belts used for this purpose are special belts. It is desirable to construct the feed worm 21 and the associated solid-wall drum member 1 surrounding said worm member as conically tapering members, in order to keep the conveying force and thereby the belt load as small as possible. The worm 21 and the surrounding portion of drum 1 widen in a direction towards the worm 10. The drum 1 is thus of double conical shape.

In the embodiment according to FIG. 1, the feed of the suspension to the worm centrifuge is effected through the hollow shaft 17 in the direction of the arrow. From said shaft the suspension enters the chamber R1 and then passes through the openings or apertures 22 into the separation chamber R2. The deposited solids are conveyed by the discharge worm 10 through the openings 23 in the flanges 2 of member 2a, into the collector 24, for discharge through outlet conduit 25. The liquid which has been freed from the solids, flows over the weir 26 and leaves the worm centrifuge at 27.

In the embodiment according to FIG. 2 of the accompanying drawing, the drive of the solid-wall drum 101 of the worm centrifuge, as well as the drive of the discharge worm, is effected in the same manner as in the worm centrifuge according to FIG. 1.

Identical members have similar reference characters in FIGS. 1 and 2.

The drive of the feed worm 121, on the other hand, is effected via the hub disc 111 and 112 and via the hub of a planetary gear transmission 29 and, hence, via the shaft 30 and the hub disc 31, on which the feed worm 121 is fixed.

In this embodiment, the suspension is introduced into the worm centrifuge through the inlet 33 and the annular intake passage 34 and thence through the opening 35 in the flange 102 into the conical inlet chamber 36. The suspension then passes through the holes 37 into the solid-wall drum 101. Instead of the above-mentioned planetary gear transmission and the belt pulley transmission gear arrangement, it is also possible to use other gear arrangements.

The position of the inlet openings 22 (FIG. 1) or 37 (FIG. 2) in the conical portion of the discharge worm may be displaced laterally, depending on particular conditions and requirements. If the solid material in the suspension has a comparatively high specific weight, the largest portion of the solids will be deposited immediately adjacent or directly below the inlet opening 22. If the solids have a lower specific weight, experience has shown that a portion of the solids is pushed away slightly, in the direction of the feed worm 21. For example, in the worm centrifuge, according to FIG. 1, the longitudinal distance from the plane containing the centers of inlet openings 22 to the partition 50 at the right hand end of worm 10 is greater than the distance between the openings 37 and the partition 150 in the worm centrifuge according to FIG. 2.

It is not absolutely necessary that the inlet holes 22 or 37 be provided in the discharge worm. According to FIG. 3, the inlet openings 37a may be provided in the feed worm drum 21a, which offers advantages under certain conditions. It is also seen that both the worms 10a and 21a may be provided with respective partitions 70,71.

According to the invention, a completely satisfactory separating effect is obtained, in the case of many materials, with a difference in speed of about $n_a=60$ r.p.m. between the discharge worm and the solid-wall drum and with a difference in speed of $n_z=8$ r.p.m. between the feed worm and the solid-wall drum. It is understood that the operation can be carried out with other differential speeds, depending on the nature of the solids in the suspension. For example, the following suitable relationships between the differences in speed between the feed worm and the discharge worm relative to the drum may be employed:

$n_a=80$  60  40  30  r.p.m.
$n_z=10$  15  10  7  r.p.m.

In the worm centrifuge of the type described above, the solids in the liquid suspension are separated from the liquid by the relative movement of the worm in the solid-wall drum, said relative movement of the worm causing the solids to be advanced to the outlet therefor at one end of the centrifuge, while the liquid which is substantially freed of solids is advanced towards the opposite end of the centrifuge. The smaller the difference in speed between centrifuge drum and the worm, the finer the particle size of the separated solids. It will be appreciated that the invention achieves a separation of solids of both coarse and fine particle size in a single self-contained unit by virtue of the two worms which are provided in end-to-end relation and which rotate at different speeds.

What is claimed is:

1. Apparatus for separating solids of different particle sizes in a liquid suspension, said apparatus comprising a rotatable drum having opposite ends, first and second worm members axially supported in end-to-end relation within said drum for independent rotation, means connected to the first worm member for rotating the first worm member at a particular rotational speed which is lower than that of the drum to provide relative rotational motion between the drum and first worm member, means connected to the second worm member for rotating the second worm member at a particular rotational speed which is greater than that of the first worm member but still less than that of the drum to provide relative rotational motion between the drum and second worm member which is less in speed than the speed of the relative rotational motion between the first worm member and the drum, means adjacent the drum for introducing the liquid suspension containing the particles of different sizes into the drum whereby the solids of larger particle size are separated in the drum and are axially advanced in one direction by the first worm member and the solids of finer particle size are separated in the drum and are axially advanced in said one direction by the second worm member while the liquid of the suspension flows in the opposite direction, outlet means at the end of the drum at the discharge end of the first worm member for the discharge of separated solids and outlet means at the other end of the drum for the discharge of liquid free of the solids.

2. Apparatus as claimed in claim 1 wherein said drum has a conical taper in narrowing manner in said one direction around said first worm member and said drum has a conical taper in narrowing direction around said second worm member in said opposite direction.

3. Apparatus as claimed in claim 1 wherein said outlet means for the discharge of liquid includes an overflow weir.

4. Apparatus as claimed in claim 1 wherein said worm members are hollow, said means for introducing the liquid suspension into the drum comprising means for introducing the liquid suspension within one of the worm members, the latter being provided with an annular arrangement of apertures proximate the other of the members to permit the outflow of liquid suspension into the drum.

5. Apparatus as claimed in claim 4 wherein said apertures are provided in the first worm member.

6. Apparatus as claimed in claim 4 wherein said apertures are provided in the second worm member.

7. Apparatus as claimed in claim 4, comprising a partition on the end of one of the worm members which is adjacent the other of the worm members, said annular arrangement of apertures being in the worm member with the partition and adjacent the latter.

8. Apparatus as claimed in claim 1 wherein said worm members have ends of substantially equal diameter adjacent one another.

9. Apparatus as claimed in claim 1 wherein said drum and worm members are supported as a single self-contained unit.

10. Apparatus as claimed in claim 1, comprising a partition on the end of one of the worm members which is adjacent the other of the worm members.

11. A worm centrifuge for separating solids from a liquid suspension in which the solids vary between coarse and fine particle size, said centrifuge comprising a self-contained unit including a single drum having a solid wall supported for rotation, and first and second worm members individually supported for rotation within the drum in end-to-end axial relation, means connected to the drum and worm members for rotating the drum and the worm members such that one of the worm members rotates faster than the other of the worm members while both worm members rotate slower than the drum, discharge means for separated solids in the drum adjacent the end of the slower rotating worm member which is remote from the faster rotating worm member and discharge means for liquid freed from solids in the drum adjacent the end of the faster rotating worm member which is remote from the slower rotating worm member.

12. A centrifuge as claimed in claim 11 wherein the slower rotating worm member is operative to separate coarser particles from the suspension and advance the coarser particles towards the discharge means for the separated solids while advancing the liquid towards the faster rotating worm member, said faster rotating worm member receiving the liquid from the slower rotating worm member, and separating the finer particles therefrom and returning the same to the slower rotating worm member for discharge along with the coarse particles while continuing the passage of the liquid now substantially free of suspended solids towards the discharge means for the liquid.

13. A centrifuge as claimed in claim 11 wherein said drum surrounding the faster rotating worm member widens conically in a direction towards the slower rotating worm member.

14. A centrifuge as claimed in claim 13 wherein the worm members are hollow, the centrifuge further comprising a partition between the worm members, and means for introducing liquid suspension into the drum through one of the hollow worm members, the latter having a plurality of apertures opening into the drum, at a location adjacent said partition.

15. A process of separating solid particles of different sizes from a liquid suspension, said process comprising separating the coarser particles from the suspension by discharging the coarser particles in a first general longitudinal direction while discharging the finer particles in liquid suspension in a generally opposite longitudinal direction, separating the finer particles from the liquid suspension by reversing the direction of the finer particles and causing the same to be discharged in said first general direction along with the coarser particles while the liquid suspension which is substantially freed from said particles is discharged in said opposite longitudinal direction.

16. A process of separating solid particles of different sizes from a liquid suspension, said process comprising advancing the coarser particles in the suspension along a path extending in a first general longitudinal direction in a first treatment zone while advancing the suspension with the finer particles therein in the opposite longitudinal direction to a second treatment zone, reversing the direction of the finer particles in the second treatment zone and returning the finer particles separated from the suspension to the first treatment zone for discharge therefrom with the coarser particles while discharging the suspension free of particles from the second treatment zone.

17. A process as claimed in claim 16 wherein the first and second treatment zones are respective worm centrifuges in which the differential speed in the centrifuge of the first treatment zone is substantially greater than the differential speed of the centrifuge of the second treatment zone.

References Cited by the Examiner
UNITED STATES PATENTS
1,806,241  5/1931  Dupuis _____ 233—7

References Cited by the Applicant
FOREIGN PATENTS
876,531  8/1942  France.
95,753  1/1898  Germany.
291,930  5/1916  Germany.

M. CARY NELSON, *Primary Examiner.*

H. KLINKSIEK, *Examiner.*